United States Patent [19]
Maddux

[11] 3,997,710
[45] Dec. 14, 1976

[54] GLASS FURNACE HAVING ELECTRICALLY HEATED SUBMERGED THROAT AND METHOD OF OPERATION

[75] Inventor: John F. Maddux, Heath, Ohio

[73] Assignee: Owens-Corning Fiberglas Corporation, Toledo, Ohio

[22] Filed: Sept. 16, 1974

[21] Appl. No.: 506,152

[52] U.S. Cl. .................................................. 13/6
[51] Int. Cl.² ....................................... C03B 5/02
[58] Field of Search ........................................ 13/6

[56] References Cited
UNITED STATES PATENTS

| | | | |
|---|---|---|---|
| 2,866,838 | 12/1958 | Paxton | 13/6 |
| 2,902,524 | 9/1959 | Paxton | 13/6 |
| 3,160,692 | 12/1964 | Paxton | 13/6 |
| 3,388,204 | 6/1968 | Ellis | 13/6 X |
| 3,400,204 | 9/1968 | Gell | 13/6 |

Primary Examiner—R. N. Envall, Jr.
Attorney, Agent, or Firm—John W. Overman; Ralph J. Skinkiss; David H. Wilson

[57] ABSTRACT

Arrangement for and methods of operating electrically heated submerged throats between glass melter and final conditioning zones are disclosed which enable the pull rate of glass to be reduced while maintaining temperature control and to be stopped without freezing the molten glass in the throat. High rates of heat loss in the throat region are compensated for with a high voltage power supply to electrodes positioned for Joule effect heating of the glass in the throat. Thermal adjustment at maximum pull rates is enhanced by the use of cooled electrodes in the throat as heat extractors with no electrical energy supplied. Low or zero pull rates can be tolerated without throat freeze-up by connecting additional voltage sources in series with the supply to the throat electrode.

6 Claims, 2 Drawing Figures

GLASS FURNACE HAVING ELECTRICALLY HEATED SUBMERGED THROAT AND METHOD OF OPERATION

BACKGROUND OF THE INVENTION

1. FIELD OF THE INVENTION

This invention relates to methods of and apparatus for maintaining glass in a molten state and partially conditioning molten glass for forming in the submerged throat between two containers for molten glass, such as a glass tank and a conditioning riser or box for wide range of pull rates.

2. DESCRIPTION OF THE PRIOR ART

Preparation of vitreous materials for formation into products involves establishing thermal conditions within the material which are of a controlled nature, usually throughout the delivered volume of material, and which fall in relatively narrow ranges. In the case of glass it has been known to melt glass constituents, for example cullet or batch, in a melter chamber in which the molten glass is raised to a temperature above that which is suitable for forming to the product sought. Frequently, the melter chambers are constructed and operated so that they deliver molten glass to the region from which it is withdrwn at temperatures in excess of those considered optimum for forming product.

In order to condition glass to the state from which it is formed it has been known to convey the material from the melter through a feed path which, for the designed rate of draw, extracts heat and brings molten glass to or near its forming condition. The thermal insulation for the path, degree of enclosure of the path, the thermal extraction effort on the glass in the path and the heat added to the glass in the path have been arranged to establish a thermal equilibrium for a given rate of flow which develops the desired forming condition. As the draw rate of molten glass is altered from the given rate, it has been suggested that the forming condition can be maintained at the delivery end of the feed duct by adjustment of the thermal extraction or adding means. Typical cooling has been accomplished by directing cooling air on the duct walls or directly on the upper surface of the glass where a free surface is available. Heating has been by means of fossil fuel fired burners in the duct and electrodes through which the energy for Joule effect heat is imposed.

Even with relatively fine tuning of thermal parameters of a heated feed path the range of adjustment has been limited to pull rates of between about fifty to one hundred percent of design capacity of the system since at the lower rates the transit time of the molten glass is sufficient to permit excessive cooling. Further, where system conditions have dictated an interruption of the forming or melting process the termination of flow in the feed path has resulted in the freeze-off of that path due to the heat loss. Such a freeze-off can be overcome in those areas where a free surface is available and fossil fuel burners can be employed to remelt the frozen glass. However in designs where the feed path includes a submerged throat no free sufrace is available and while attempts at removal of some refractory and remelting with burners has met with limited success, generally the freeze-off ends the campaign of the system.

Submerged throats have in some instances been subjected to Joule effect heating by locating electrodes beyond the throat at its opposite ends. In the usual Joule effect heated design there is insufficient electrical capacity to apply the requisite heat to the molten glass in the submerged throat by external electrodes. Typically a feed duct about eight feet long having a cross section about 12 inches high and 18 inches wide from a submerged throat in the melter to a riser conditioning box has been provided with electrodes located on the center line of the duct with one in the melter about a foot ahead of the throat and the other in the riser.

Electric heating of molten glass by Joule effect is complicated by the negative temperature co-efficient of resistance of the glass. As the glass temperature increases the resistance decreases to a degree that can create a runaway condition due to the increaed current and the squared current relationship to Joule effect heating. Conversely as the glass temperature decreases, a critical value can be achieved at which the decreased current, which can be imposed within the voltage limitations of the source of electrical power, reduces the Joule effect heating below that level which will sustain the melt temperature against the inherent heat loss of the mass and its constraining walls. In the case of Joule effect heated submerged throats in which heat loss exceeds the capacity to add heat, the drop in the temperature of the molten glass can enter a negative runaway condition wherein the glass is cooled to a temperature at which the available voltage to the electrodes in the melter and riser is insufficient to sustain glass temperature. Under these conditions the glass in the throat freezes effectively ending the campaign of the system.

Catastrophic cooling of an electrically heated submerged throat for a glass melting system can occur in normal operation of the system where the pull rate is reduced to a level at which the heat is extracted from the molten glass in that area at a rate which exceeds the capacity of the Joule effect heating system to maintain the necessary forming temperature at the feed path exit. It also can occur where there is a loss of electrical power for a substantial interval. In this latter instance the reduced heat capacity of the feeder path and its designed cooling construction causes the glass therein, particularly in a submerged throat to freeze before that of the melter and even if power is recovered before the melter glass cools below the critical temperature system campaign is ended.

SUMMARY OF THE INVENTION

The present invention relates to methods of and apparatus for feeding and conditioning molten material and more particularly to electrically heated apparatus for feeding and conditioning molten material such as glass from a melter to forming apparatus and the method of operating such feeding and conditioning apparatus.

One object is to improve the conditioning of molten material to be formed into product.

Another object is to increase the range of practical flow rates of molten material in feeding and conditioning apparatus, particularly in submerged throats having electrical heating means.

Another object is to maintain glass in an electrically heated submerged throat molten under a reduced or even zero rate of draw of molten glass.

Another object is to maintain molten that glass in an electrically heated glass melting and refining system which is located in a submerged throat where only limited power is available.

DESCRIPTION OF THE PREFERRED EMBODIMENT

Figure 1:
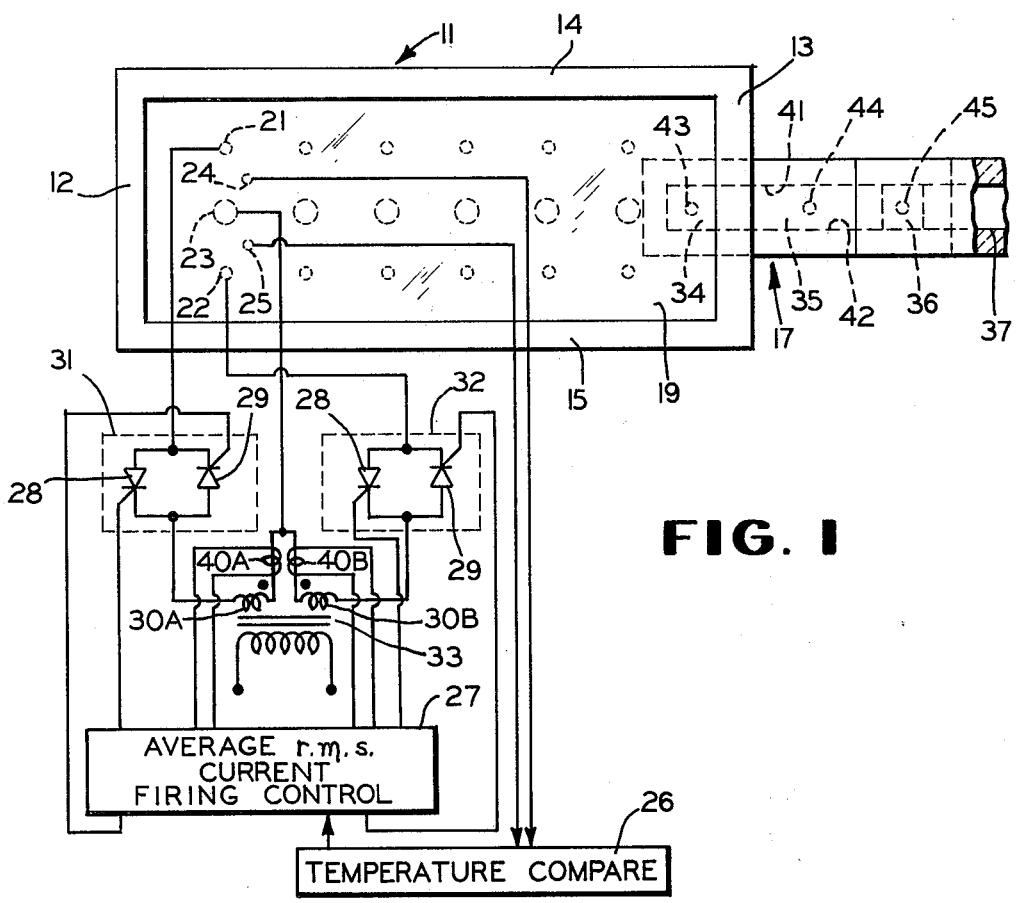
FIG. 1 is a schematic plan view of a typical glass melting furnace, throat, riser, and portion of a final conditioning channel illustrating an orientation of electrodes according to the invention, and a schematic block diagram of a typical power supply for Joule effect heating of glass in a zone of a melter.

A glass melting furnace 11 having back wall 12, front wall 13, side walls 14 and 15 and bottom wall 16 is illustrated as typical of melters from which molten material is withdrawn through throat 17. Furnace 11 is in the form of an open top tank containing molten glass 18 beneath a blanket of glass batch 19. Joule effect heating of the glass 18 is accomplished by the controlled application of alternating electric current between electrodes arrayed in rows as outer electrodes 21 and 22 each of which are in circuit with a center electrode 23. Each row of electrodes 21, 23, 22 across the longitudinal axis of the melter 11 supplies a heat zone so that the molten glass has a longitudinal thermal profile having a peak temperature about two thirds of the length from the back wall 12.

A typical zone is heated as two subzones extending across the furnace, as the subzone between 21 and 23 and the subzone between 22 and 23, by applying a constant r.m.s. current. The glass temperatures at a plurality of locations within each thermal zone are monitored as by thermocouples 24 and 25 in the furnace floor and are compared with each other. A variation in the several temperatures of a zone or subzone outside a permissible range alters the operation of the furnace zone by temperature compare circuit 26 to bring the glass temperature to a uniform profile across the path of glass flow from back wall 12 to front wall 13. This is accomplished by an average r.m.s. current firing control 27 which controls the phase angle firing of back-to-back SCRs 28 and 29 in each zone's current control circuit 31 and 32, connected in series with a lead from the oppositely wound secondaries 30A and 30B transformer 33 arranged to have their voltages polarized as indicated by the dot symbols. Advantageously, the circuits of electrode 21 and 23 and 22 and 23, respectively supplied by secondaries 30A and 30B, and those secondaries are balanced whereby under normal operation the ends of the secondaries connected to common electrode 23 are at the same potential when their respective current control circuits 31 and 32 are fired. Current sensing for each of the circuits is provided by current transformers 40A and 40B to the average r.m.s. current firing control 27. Manual or automatic controls (not shown) can be provided for the circuits 27 and/or 26 of each circuit for the six zones represented by the six rows of electrodes illustrated.

Molten glass is withdrawn from the melter through a draw-off channel 34 in the furnace bottom extending to a submerged throat or duct 35 communicating with a riser 36 and conditioning channel 37 which delivers the molten glass to a forehearth (not shown). In practice, the glass entering the throat is at a temperature substantially above that which is optimum for delivery to the forming mechanisms fed from the forehearth. Accordingly, the temperature of the glass is manipulated in a controlled manner in the throat 35, riser 36 and/or conditioning channel 37 to achieve the desired temperature state.

Cold top electric furnaces of the type typified by the illustrative example have a submerged throat 35 or duct which is of relatively limited cross section and has a high ratio of enclosing surface area to the volume of molten glass enclosed as compared to the ratio of enclosing surface to volume in melter 11. Typically, the throat has an internal cross section of about 200 square inches in a rectangular form about eighteen inches wide and about twelve inches high with glass contacting top wall 38, bottom wall 39 (which can be a continuation of the bottom of the draw-off channel 34 and riser 36 at its longitudinal ends) and side walls 41 and 42. By nature of the large ratio of surface area to volume, heat is extracted rapidly from the molten glass flowing through the throat, the degree of cooling being a function of the dwell time of the molten glass in the throat.

The head 40 of molten glass in the riser 36 determined by the glass 18 and bath 19 levels in the furnace is sufficient to prevent any free surface of molten glass within the throat 35. Hence no fossil fuel burners can be employed to maintain glass temperature in submerged throats and augmenting heat is supslied by Joule effect heating. Prior systems have employed an electrode in the melter ahead of the throat entrance as electrode 43 and an electrode in the riser as electrode 45. In the present system Joule effect heating is between electrodes 43, 44 and 45 located and supplied in a manner to cause electric current to flow in the molten glass of the throat 35 and its associated riser 36. Since conditioning of the glass includes reducing its temperature from that at which it was withdrawn from the melter 11, the system is designed to permit this heat loss and to make up a portion of that loss where necessary as for low pull rates. Ordinarily when the glass is pulled at the capacity rate of the system, its heat loss in the throat is arranged to deliver glass to the riser at a temperature which can be further modified to the forming temperature in the riser and conditioning duct. At lower rates of pull the glass may cool excessively. Trimming of glass temperature has been accomplished in part in the throat by adding heat in that region to retard cooling and further in the riser and conditioning channel by additional heat. The range of pull rates within which this trimming has been effective is from capacity down to about 50% capacity.

A limiting factor below the lower limit of pull rate has been the tendency of the glass to over cool in the throat and even to freeze-off flow in that region. In order to overcome this tendency to freeze at low pull rates and even at a zero rate of pull, the system of this invention is arranged to develop sufficient Joule effect heating in the throat to enable molten glass therein to be maintained above the critical temperature at which its temperature becomes so low and its resistivity thus becomes so high that Joule effect heating with the available voltage cannot match the heat loss. This match has been achieved by providing an electrode 44 in the throat between electrodes 43 and 45, and providing a greater voltage than employed heretofore across the glass in the throat. For example, where prior systems were energized with 150 volts r.m.s. across the electrodes applying current to the throat, for a given glass and thermal system, with a pair of upstanding cylindrical electrodes typically of molybdenum of about three inches diameter the desiderata of this invention is achieved with a 240 volt r.m.s source having a power capacity of about 65 k. v. a. or more. Joule effect heating is achieved by passing current between the melter-throat electrode 43 and throat electrode 44, and between throat electrode 44 and riser electrode 45. With sodium-boro-silicate type glasses as employed, for example, in the production of thermal insulating glass wool, the principal electric resistance in the Joule effect heating arises in the molten glass of the reduced cross section of the submerged throat 35 where the throat electrode 44 is about 6 or 7 feet from the mouth of the throat at the melter 11. In such an arrangement the much greater cross sectional area of the current path in the melter 11 to melter-throat electrode 43 adds so little resistance that even though melter-throat electrode 43 may be several feet from the mouth of the throat its spacing is not significant and, practically it can be considered to be at the mouth. With this higher voltage and a control which has the capability to apply a range from essentially zero to the maximum voltage to the electrodes, the system can be operated from a condition in which no heat is applied by Joule effect in the throat to a condition in which essentially the only heat applied in the system is by Joule effect in the throat. This latter condition can arise where the main source of heat is curtailed or lost.

The concept of a Joule effect heat capacity matching the cooling occurring in the submerged throat avoids the effective termination of the campaign of a glass melting and forming system caused by throat freeze-off. Thus, not only can the range of draw rate be expanded toward low rates for normal operation, but, where a breakdown of equipment dictates a "hold" condition, a zero pull rate can be maintained without throat freeze-off. Further, where the main source of heat is lost or reduced to a level where the temperature of the glass in the melt is reduced, throat freeze-off can be avoided as by concentrating available electrical power in the throat. At an intermediate power input to the melter, the back portion of the melter can be permitted to cool even to the freezing temperature while the front portion is maintained molten at a lower temperature than has been tolerable heretofore and the glass temperature in the throat sustained by application of increased volatage for increased Joule effect heating.

Thermal capacity of the Joule effect heating means for a submerged throat can be reduced somewhat where the losses in the throat are less than that required to cool the molten glass to its desired temperature for entry into the riser at the maximum design rates of pull. This reduced heat loss requires less Joule effect heat makeup at low pull rates. However, at maximum pull rates, and thus minimum throat dwell time and heat loss, augmenting cooling is advantageous. One such cooling means is to cool the electrodes 43, 44 and 45 in the vicinity of the throat and extract heat from the molten glass through those electrodes.

Figure 2:
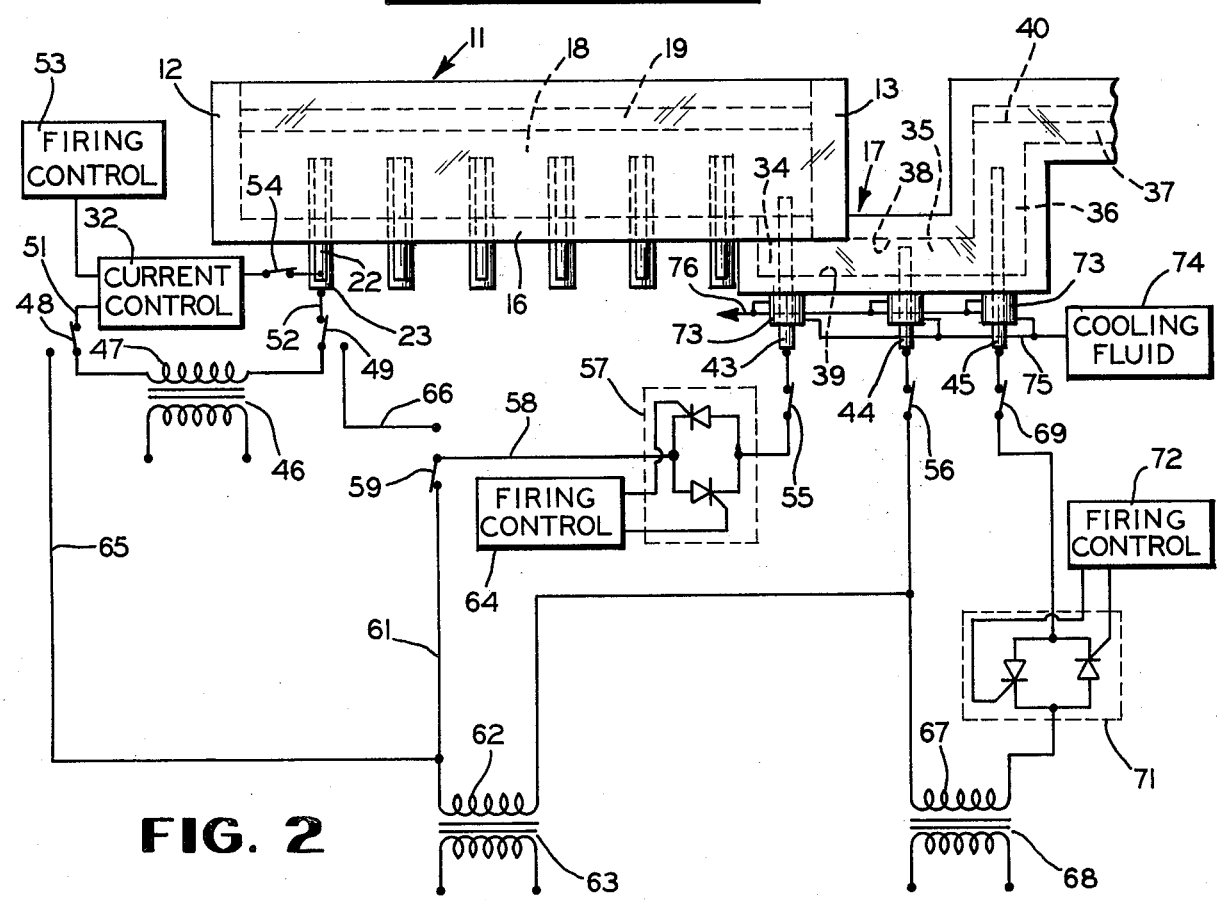
FIG. 2 is a schematic side elevation of the elements of FIG. 1 and a schematic representation of electrical heating circuits and a cooling arrangement for the throat and riser electrodes according to an embodiment of the invention, including alternative connections for augmenting the throat electrode voltage supply.

In FIG. 2 a simplified power supply to one circuit of the first zone of the melter 11 is shown as comprising a transformer 46 having its primary supplied by suitable alternating current to develop of the order of 150 volts on its secondary 47. Secondary 47 is coupled through switches 48 and 49 to leads 51 and 52 supplying electrodes 22 and 23 through the phase controlled back-to-back SCRs of current control circuit 32 as controlled by the phase or firing control 53. A disconnect switch 54 is provided to electrode 22 as with each electrode to enable its associated circuits external of the melt to be isolated from melt potentials.

Electrodes 43 and 44 are connected through disconnect switches 55 and 56 to a current control circuit 57, and lead 58, transfer switch 59 and lead 61 to secondary 62 of alternating current power supply transformer 63. Where sodium-boro-silicate type glasses for the production of glass wool and having a resistivity of the order of 1.2 ohm-inches at a melting and refining temperature of 2600° F. are processed, the negative temperature co-efficient of resistance is such that, with effective electrode spacings between 43 and 44 of six or seven feet along the throat, a freezing runaway condition occurs with 150 volts r.m.s. available when the temperature falls to about 2200° F. According to the present invention, a voltage of 240 volts r.m.s. enables the pull rate to be controlled down to about 10% of rated capacity and allows the molten state to be retained at a zero rate of pull. In one preferred embodiment, the throat power supply is imposed at 480 volts r.m.s. or about three times normal and the throat firing control 64 limits the effective voltge and imposed power in the throat to that which might otherwise be derived from a 150 volt r.m.s. source during the higher rates of pull i.e. above about 50% of rated capacity.

An alternative arrangement where lower voltage is imposed on the throat electrode from secondary 62 which is insufficient at very low pull rates, as at a zero pull rate, is illustrated in FIG. 2 whereby the available voltage to be applied across glass in the throat is augmented. One such means of augmenting th throat voltage is to transfer voltage applied to electrodes normally employed for Joule effect heating another part of the system. For example, the rear zone of the furnace can be shut down and a transformer supplying its power can be serially connected in aiding relationship with secondary 62 to increase the applied voltage across the glass in the throat. This requires a current control circuit 57 which accommodates the voltage peaks imposed when the two in phase voltages are summed. Assume for example that the voltage at secondary 62 is insufficient to maintain the throat glass molten by Joule effect heating between electrodes 43 and 44 and that when augmented by 150 volts r.m.s. it will be adequately supplied to overcome the heat loss in the throat 35. The 150 volts of secondary 47 can be disconnected from electrodes 22 and 23 by transferring switches 48 and 49 from the positions shown in FIG. 2 to the alternative positions connected to leads 65 and 66. Secondary 47 is then connected in series with secondary 62 by transferring switch 59 to its alternative position to connect leads 58 and 66.

While the disconnecting of the supply to the back zone of the melter may permit cooling in the melter, under low pull rates the melter does not require the amount of heat available from all of its heating circuits. Further in an emergency type of condition where the main power is lost, local plant power as by in-plant generators of limited capacity can be coupled to the primaries of transformers 46 and 63 to maintain the glass in throat 35 molten with higher voltage Joule effect heating.

Riser 36 and the output end of the submerged throat also lose heat and require a heat augmenting source for low pull rates. As shown in FIG. 2 electrode 45 can be placed in circuit with throat electrode 44 for Joule effect heating at the throat-riser interface and in the riser. These electrodes can be spaced four or five feet apart. As in the case of the submerged throat, a freeze-off in the enclosed and limited cross section of the riser 36 can terminate the campaign of the system because of the difficulty of applying sufficient heat to remelt glass frozen therein. Accordingly in those instances where controlled low pull rates are contemplated riser power should also be at a higher voltage than is conventional. Secondary 67 of alternating current supplied transformer 68 is coupled to electrode pair 44 – 45 through disconnects 56 and 69, and the phase control fired SCRs of current control 71 as controlled by firing control 72.

Where the thermal balance is such that ambient cooling or external cooling of throat passage 35 or riser 36 is insufficient at maximum pull rates, cooling of the glass can be augmented by removing power from one or more of electrodes 43, 44 and 45 and utilizing them as heat absorbers. Each electrode can be provided with a jacket 73 through which cooling fluid from source 74 is circulated as from supply main 75 and then pased to exhaust main 76.

It has been found that wool glass in a throat of about two hundred square inches cross section can be maintained molten at zero rate of pull with between 80 and 85 k.v.a. at 240 volts, however where temperature recovery is required greater voltage and power input is required. The voltage and power for any particular combination of perameters is a function of the heat loss in the throat and the electrical resistance of the throat thus as the cross sectional area is reduced the voltage requirements increase and to a lesser extent the acceptable electrode spacing is reduced. Further the glass composition is significant in that it affects the resistivity and temperature coefficient of resistance of the glass. Typically E glass is of higher resistivity and would require voltages about three times those discussed with respect to the example where wool glass is involved.

It is to be appreciated that the applied Joule effect heating in the throat and/or riser is proportioned to develop the desired temperature in the molten glass by control of the firing controls 64 and/or 72. Suitable monitoring means can be provided to ascertain glass temperature in the throat or at the throat-riser interface and either manually adjustable controls or controls responsive to the monitoring means can be employed in controlling the firing controls. When voltage imposed on the throat or riser power supply circuits is stepped up, as by the illustrated serial connection of an augmenting source the phase angle of firing of the SCRs is adjusted to achieve the power dissipation required, as by providing a shorter conduction interval for the higher voltage with other parameters held constant.

The present invention lends itself to many variations and can be combined with systems other than that shown. Accordingly it is to be understood that the preceding disclosure is to be read as illustrative of the invention and not in a limiting sense.

I claim:

1. A glass melting and forming system comprising a glass melter in which glass is raised to a temperature above that at which it is to be formed; a conditioning chamber in which glass is brought to a temperature at which it is to be formed; a submerged throat of limited cross section for conveying molten glass from said melter to said conditioning chamber, said throat having the characteristic that in the absence of the application of heat the molten glass is cooled in the throat at a more rapid rate than molten glass is cooled in the melter in the absence of the application of heat; a first upstanding, rod-like electrode in said melter adjacent said throat; a second upstanding, rod-like electrode in said throat; a source of electrical power including a first power supply connected between said first and second electrodes; a second power supply; and means to selectively connect said first and second power supplies in series aiding, in phase relationship, whereby said selectively connected supplies have the capacity to develop sufficient heat by Joule effect heating in the molten glass to maintain in a molten state molten glass which is contained in said throat and subject to the cooling rate of said throat.

2. A glass melting and forming system comprising a glass melter in which glass is raised to a temperature above that at which it is to be formed; a conditioning chamber in which glass is brought to a temperature at which it is to be formed; a submerged throat of limited cross section for conveying molten glass from said melter to said conditioning chamber, wherein said throat has a cooling rate for molten glass contained thereby which is insufficient to cool to a desired throat exit temperature said molten glass drawn therethrough at the maximum draw rate of the system, and a cooling rate for the molten glass therein which is greater than the cooling rate for the molten glass in the melter in the absence of the application of heat; a first upstanding, rod-like electrode in said melter adjacent said throat; a second upstanding, rod-like electrode in said throat; a source of electrical power connected between said first and second electrodes and having the capacity to develop sufficient heat by Joule effect heating in the molten glass to maintain in a molten state molten glass which is contained in said throat and subject to the cooling rate of said throat; and means to cool said second electrode whereby said second electrode extracts heat from said molten glass in said throat.

3. The method of establishing a desired temperature in molten glass at its entry into a conditioning chamber for the glass comprising: heating said glass to a temperature higher than said desired temperature in a first chamber; passing said glass from the first chamber through a submerged generally horizontally extending throat in which it loses heat at a rate which at maximum flow rates of glass through the throat cools the molten glass at the exit of the throat communicating with said conditioning chamber nearly to the desired temperature; and adjusting the heat loss in the throat through a metallic rod extending vertically into the glass in the throat by the extraction of heat through the metallic rod including the step of cooling a portion of the metallic rod external of the throat.

4. The method of establishing a desired temperature in molten glass at its entry into a conditioning chamber for the glass comprising: heating said glass to a temperature higher than said desired temperature in a first chamber; passing said glass from the first chamber through a submerged generally horizontally extending throat in which it loses heat at a rate which a maximum flow rates of glass through the throat cools the molten glass at the exit of the throat communicating with said conditioning chamber nearly to the desired temperature; adjusting the heat loss in the throat through a metallic rod extending vertically into the glass in the throat; adding heat to the molten glass in the throat through the metallic rod, when required to adjust to excessive heat loss, by adjusting a source of electrical power connected between the metallic rod functioning as a first electrode and a second electrode spaced from the rod to provide Joule effect heating in the glass; and connecting a second source of alternating current power in series with the first mentioned source of power to develop sufficient voltage between the rod and the second electrode to match the heat loss from the throat with the Joule effect heat developed in the molten glass between the electrode and the rod during low rates of flow of glass through the throat.

5. The method of preventing the freeze up of molten glass in a submerged throat communicating between a first and a second container for molten glass where the submerged throat has a ratio of contact area with the molten glass to the volume of molten glass therein which results in a high rate of transfer of heat from the molten glass therein and wherein one of the containers has Joule effect heating means and an alternating current source therefor comprising the steps of providing an electrode in the molten glass in the throat; passing current from a source of alternating current power through the electrode and molten glass in the throat to make up a portion of the heat loss from the glass by Joule effect heat developed therein as it flows through the throat; said first mentioned alternating current source being independent of the source passing current through the electrode in the throat; reducing the rate of flow of molten glass between the throat and the one container; and transferring the independent source from the heating means in the one container to a series connection with the source passing current through the electrode in the throat to augment the Joule effect heating on the molten glass in the throat.

6. The method according to claim 5 wherein the voltage applied across the molten glass in the throat from the serially connected sources and the resultant current produces Joule effect heating in the molten glass sufficient to balance the heat loss from the glass when the flow of glass in the throat is essentially zero.

* * * * *